(12) United States Patent
Kim et al.

(10) Patent No.: US 10,004,052 B2
(45) Date of Patent: Jun. 19, 2018

(54) APPARATUS AND METHOD FOR ESTIMATING DOPPLER SHIFT IN UNDERWATER COMMUNICATION

(71) Applicant: KOREA INSTITUTE OF OCEAN SCIENCE AND TECHNOLOGY, Gyeonggi-do (KR)

(72) Inventors: Seung-Guen Kim, Daejeon (KR); Yong-Kon Lim, Daejeon (KR); Sea-Moon Kim, Daejeon (KR); Jong-Won Park, Daejeon (KR); Changho Yun, Sejong-Si (KR)

(73) Assignee: KOREA INSTITUTE OF OCEAN SCIENCE AND TECHNOLOGY, Gyeonggi_Do (KR)

( * ) Notice: Subject to any disclaimer, the term of this patent is extended or adjusted under 35 U.S.C. 154(b) by 176 days.

(21) Appl. No.: 14/980,122

(22) Filed: Dec. 28, 2015

(65) Prior Publication Data
US 2016/0192307 A1    Jun. 30, 2016

(30) Foreign Application Priority Data

Dec. 30, 2014 (KR) .............................. 2014-0193653

(51) Int. Cl.
*H04B 1/709* (2011.01)
*H04W 56/00* (2009.01)
(52) U.S. Cl.
CPC ..... *H04W 56/004* (2013.01); *H04W 56/0065* (2013.01)

(58) Field of Classification Search
CPC ............ H04W 56/004; H04W 56/0065; H04B 1/7093; H04B 7/0671; H04B 1/709; H04B 1/7113; H04B 17/364
(Continued)

(56) References Cited

U.S. PATENT DOCUMENTS 5,774,494 A * 6/1998 Sawahashi ............. H04B 1/707
375/152
6,134,262 A * 10/2000 Kitade ................... H04B 1/707
375/142
(Continued)

FOREIGN PATENT DOCUMENTS

KR 10-0712431 4/2007
KR 10-2008-0044198 2/2010

*Primary Examiner* — Emmanuel Bayard
(74) *Attorney, Agent, or Firm* — Dentons US LLP

(57) ABSTRACT

Disclosed is an apparatus and method for estimating a Doppler shift for underwater communication. The apparatus includes: a multipath delay profile determiner for detecting a correlation of a known signal 1 and a received packet signal and time ($T_{1o}$) at a point having maximum energy of the correlation, and detecting a multipath delay profile at the time ($T_{1o}$); a correlation calculator for calculating a correlation between a correlation of a known signal 2 and the received packet signal, and the multipath delay profile; a maximum value detector for detecting time ($T_{2o}$) at a point having maximum energy of the correlation calculated by the correlation calculator; and a Doppler shift estimator for determining a Doppler shift using a difference between the time ($T_{1o}$) and the time ($T_{2o}$) at points having respective maximum energy.

14 Claims, 7 Drawing Sheets

(58) Field of Classification Search
USPC .................................. 375/150, 142, 152, 343
See application file for complete search history.

(56) References Cited

U.S. PATENT DOCUMENTS

| | | | |
|---|---|---|---|
| 6,954,485 B1* | 10/2005 | Hashimoto | H04B 1/70756 370/335 |
| 2001/0010703 A1* | 8/2001 | Ohsuge | H04B 1/7113 375/148 |
| 2005/0111526 A1* | 5/2005 | Bilgic | H04B 1/7117 375/147 |
| 2007/0217551 A1* | 9/2007 | Kang | H04H 60/11 375/343 |
| 2008/0267303 A1* | 10/2008 | Baldemair | H04B 1/7075 375/260 |
| 2010/0117884 A1* | 5/2010 | Ahmed | G01S 19/21 342/14 |
| 2010/0173645 A1* | 7/2010 | Kangas | G01S 5/06 455/456.1 |
| 2010/0271263 A1* | 10/2010 | Moshfeghi | G01S 5/0263 342/378 |

\* cited by examiner

APPARATUS AND METHOD FOR ESTIMATING DOPPLER SHIFT IN UNDERWATER COMMUNICATION

CROSS REFERENCE TO RELATED APPLICATION

The present application claims priority to Korean Patent Application No. KR 2014-0193653, filed Dec. 30, 2014, the entire contents of which is incorporated herein for all purposes by this reference.

BACKGROUND OF THE INVENTION

1. Field of the Invention

The present disclosure generally relates to an apparatus and method for estimating a Doppler shift for underwater communication and, more particularly, to an apparatus and method for estimating a Doppler shift for underwater communication, which may estimate a Doppler shift by computing correlations between output values of a matched filter and using a time gap between points at which the correlations have maximum values.

2. Description of the Related Art

In terrestrial and underwater radio communications, a Doppler shift occurs by relative movements of communication devices. The Doppler shift increases relative to an increase in approaching or receding speed of a relative distance between the transmitter and receiver according to the Doppler effect.

For example, a wavelength of light changes according to movement of an object, i.e., it becomes longer as the object moves farther away and becomes shorter as the object moves closer.

While a Doppler shift occurs, respective frequency components of a signal undergo different Doppler shifts and the length of the signal becomes long or short relative to an amount of the Doppler shift. To quantitatively represent the Doppler shift, a relative Doppler shift, $\Delta$, is used, which may be expressed in the following equation 1:

$$\Delta = v/c \tag{1}$$

where, v is a relative difference in moving speed between the transmitter and the receiver, and c is the velocity of waves in the medium. Due to the Doppler shift, distortions may occur in the received signal on the time axis r(t) and the frequency axis $f^D$, which may be expressed in the following equations 2 and 3, respectively:

$$r(t) = s((1+\Delta)t) \tag{2}$$

$$f^D = f(1+\Delta) \tag{3}$$

where s(t) is a signal for transmission, r(t) is a Doppler-shifted received signal, f is one of frequency components of the signal for transmission of a bandwidth, and $f^D$ is a frequency component resulting from a Doppler shift of the frequency component f.

In terrestrial radio communications using radio waves, the speed of waves c is defined to be approximately $3 \times 10^8$ m/s, which is the same as the speed of light. Generally, in terrestrial radio communications, signals having a few kHz to tens of MHz of bandwidth are transmitted at a carrier frequency of hundreds of MHz to a few GHz. For example, in the case of Automatic Identification System (AIS) used in the safe operation of vessels, communication data is transmitted at a frequency around 160 MHz of carrier frequency on a channel having a bandwidth of 25 kHz. Furthermore, assuming that the relative moving speed between the transmitter and receiver is about 15 m/s (or 54 km/h), the relative Doppler shift $\Delta$ has a very small value. Since packet signals typically used in radio communications are about tens of ms long, an amount of increase or decrease in signal length resulting from the Doppler shift is very small in one packet length, and thus the distortions occurring on the time axis can often be ignored. However, the carrier frequency used for terrestrial communications is about within a few MHz to a few GHz, and the signal may be distorted due to distortions occurring on the frequency axis from the Doppler shift. A frequency band of signals used for terrestrial communications is a narrow band having a relatively small ratio of carrier frequency to bandwidth, which is often less than a few percentage of the carrier frequency. Accordingly, all frequency components in the signal band may be approximated to the carrier frequency to be subject to the same Doppler shift. In terrestrial narrow band communication, such a Doppler shift is approximately considered as a carrier frequency error, which is estimated and compensated using a frequency-shift synchronization method.

Since a velocity of waves in a medium that transmits information in underwater communication using sound waves is about 1500 m/s, and the velocity of waves in a medium in terrestrial communication is about $3 \times 10^8$ m/s, a Doppler shift in underwater communication using sound waves may appear to be $2 \times 10^6$ times greater than in terrestrial radio communication that uses radio waves at the same relative difference in moving speed between the transmitter and the receiver.

In underwater communication using sound waves, a carrier frequency is about from a few kHz to tens of kHz, and the usage bandwidth of the signal becomes up to tens of percentage of the carrier frequency, that is, the underwater communication signal is a wideband signal. In underwater communication, the wideband signal may lead to occurrence of different frequency shifts at the same Doppler shift for respective frequency components of the signal, and may thus be more appropriately approximated with a change in length of a received packet signal due to the Doppler shift in the time domain. The Doppler shifted received packet signal is expressed in the equation 2.

FIG. 1 shows a structure of a packet signal for underwater communication. Referring to FIG. 1, in conventional underwater communication using wideband signals, in order to estimate a Doppler shift, known signals 10 and 30 are transmitted by being placed at either ends of packet data 20 with a known length, and the receiver uses a method for estimating the Doppler shift based on a time gap $T_{RX}$ (between two signal points where peak values of outputs of matched filtering of the known signals from a matched filter appear, a time gap $T_{TX}$ between the two known signals, and a relationship with the Doppler shift, as expressed in equation 4.

Equation 4 is as follows:

$$\hat{\Delta} = \frac{T_{RX} - T_{TX}}{T_{TX}} \tag{4}$$

where, $T_{TX}$ is a gap between signals transmitted to estimate a Doppler shift, and $T_{RX}$ (is a time gap between two points that represent peak values of outputs of a matched filter in the receiver, which may be greater or smaller than $T_{TX}$ according to the Doppler shift.

In underwater communication using sound waves, as previously described, the known signals 10 and 30, known to be robust to Doppler shift, are placed at either ends of the packet data 20, or placed with a predetermined interval, and the receiver uses a method for estimating a Doppler shift by measuring a time gap between two peak values of outputs of a matched filter.

The method may be suitably used when there is an Additive White Gaussian Noise (AWGN) channel or when one path among multipaths has a much larger energy than others. However, underwater channel conditions are characterized in that there may be similar size multipath components, that the multipath components with a sparse distribution arrive at the receiver end, and that the multipath components are changed in size over time, that is, time-varying channel response. In the time-varying multipath underwater channel condition, if there are multipath components having similar magnitude, peak values of the outputs of the matched filter corresponding to the front and rear parts of the packet may be determined based on respective different paths due to the variation of the magnitude of the multipath components.

FIG. 2 shows an instance of occurrence of an error in estimation of a Doppler shift using conventional estimator when there are similar size multipaths. In the case that there are two multipaths with similar sizes in the reception of a signal having a structure of a packet signal 100 of FIG. 2, when a known signal 1 110 and a known signal 2 130 are received, the sizes of the respective multipaths and a difference in arrival time are represented in FIG. 2 by solid and dashed arrows for the two multipaths, respectively. As can be seen from FIG. 2, the path represented by the solid line has the largest size in receiving the known signal 1 110, and the path represented by the dashed line has the largest size in receiving the known signal 2 130. In this case, using the aforementioned method for estimating a Doppler shift commonly used in underwater communication causes an error in estimation of the Doppler shift. In other words, an error occurs in measurement of the time gap between the two peak values, leading to an error in estimation of the Doppler shift.

SUMMARY OF THE INVENTION

Accordingly, the present invention has been made keeping in mind the above problems occurring in the prior art, and an object of the present invention is to provide an apparatus and method for estimating a Doppler shift for underwater communication to prevent occurrence of an error in measuring a time gap between two peak values of outputs of a matched filter corresponding to front and rear parts of a packet in a case that the two peak values are determined by different paths.

In order to accomplish the above object, the present invention provides an apparatus for estimating a Doppler shift for underwater communication.

The apparatus includes: a multipath delay profile determiner for detecting a correlation between a known signal 1 and a received packet signal, time ($T_{1o}$) at a point having maximum energy of the correlation, and a multipath delay profile at the time ($T_{1o}$); a correlation calculator for calculating a correlation between the multipath delay profile and a correlation between a known signal 2 and the received packet signal; a maximum value detector for detecting time ($T_{2o}$) at a point having maximum energy of the correlation calculated by the correlation calculator; and a Doppler shift estimator for determining a Doppler shift using a difference between the time ($T_{1o}$) and the time ($T_{2o}$) at points having respective maximum energy.

The apparatus may further include: a matched filter for receiving the packet signal and performing matched filtering on the received packet signal; and a second known signal range calculator for calculating a range in which the known signal 2 exists.

The multipath delay profile determiner is configured to calculate the correlation of the received packet signal and the known signal 1 with respect to time ($T_1$) corresponding to a starting point of the received packet signal, as in the following equation:

$$\chi_{sr}(t_1) = \int_0^{T_s} s^*(\tau) r(t_1+\tau) d\tau, \text{ for}$$

$T_1 - T_{window-low} \le t_1 < T_1 + T_{window-high}$, calculate accumulated energy of correlations over Tch time in a window zone as in the following equation:

$$E(t_{11}) = \int_0^{T_{ch}} |\chi_{sr}(t_{11}+\tau)|^2 d\tau, \text{ for}$$

$T_1 - T_{window-low} \le t_{11} < T_1 + T_{window-high} - T_{ch}$, and determine matched filtered data corresponding to a point at which the accumulated energy of correlations in the window zone has the maximum value as the multipath delay profile.

The second signal range calculator is configured to represent the range ($T_X$) in which the known signal 2 exists as in the following equation:

$$T_X = (T_2 - T_{2a}, T_2 + T_{2a}), \text{ where}$$

$T_2 = T_{1O} + T_{TX}$, $(-T_{2a}, T_{2a})$ is a range of changes in arrival time of a first signal and represented by $T_{2a} = T_{TX} \times \Delta_{max}$, $\Delta_{max}$ denotes a maximum amount of a relative Doppler shift, and $T_{TX}$ denotes a time gap between the two known signals.

The matched filter is configured to calculate the correlation $\chi_{sr}(t_2)$ of the known signal 2 and the received packet signal as in the following equation:

$$\chi_{sr}(t_2) = \int_0^{T_s} s^*(\tau) r(t_2+\tau) d\tau \text{ for}$$

$T_2 - T_{2a} - T_\alpha \le t_2 < T_2 + T_{2a} + T_\beta$, where, $T_\alpha$ and $T_\beta$ have values of zero or more, which are determined according to the margin of detection range for estimation of a Doppler shift in the stage of system design, wherein the correlation calculator is configured to calculate a correlation between a correlation for ($\chi_1(t) = \chi_{sr}(T_{1O}+t)$ for $0 \le t \le T_{ch}$) in a window zone and the calculated correlation ($\chi_{sr}(t_2)$) as in the following equation:

$$\chi_{\chi\chi}(t_2) = \int_0^{T_{ch}} \chi_a^*(\tau) \chi_{sr}(t_2+\tau) d\tau \text{ for}$$

$T_2 - T_{2a} - T_\alpha \le t_2 < T_2 + T_{2a} + T_\beta$, and wherein the maximum value detector is configured to detect the time ($T_{2o}$) of a point at which energy of the correlation between multipath delay profile determiner for the known signal 1 and the correlation between the known signal 2 and the received packet signal $\chi_{sr}(t_2)$ has the maximum value, as in the following equation:

$$T_{2O} = \max_{t_2} |\chi_{\chi\chi}(t_2)|^2.$$

The Doppler shift estimator may be configured to obtain the Doppler shift in the following equation:

$$\hat{\Delta} = \frac{T_{2O} - T_{1O}}{T_{TX}},$$

where $T_{TX}$ refers to a time gap between two known signals.

The apparatus may further include an energy calculator for receiving a packet signal and calculating energy of the matched filtered packet signal; a comparator for comparing the energy of the packet signal calculated by the energy calculator with a threshold; and a packet signal start detector for analyzing the comparison result from the comparator to determine that the packet signal begins at the point if the energy is greater than the threshold, and sending information about the point at which the packet signal begins to the multipath delay profile determiner.

In order to accomplish the above object, the present invention also provides a method for estimating a Doppler shift for underwater communication.

The method includes a first detection process of detecting a correlation between a known signal 1 and a received packet signal, time ($T_{1o}$) at a point having maximum energy of the correlation, and a multipath delay profile; a second detection process of detecting time ($T_{2o}$) of a point having maximum energy of a correlation between a correlation between a known signal 2 and the received packet signal and the multipath delay profile; and a Doppler shift estimation process of determining a Doppler shift using the time ($T_{1o}$) and the time ($T_{2o}$).

The first detection process may include determining whether it is a starting point of the received packet signal; performing matched filtering on the received packet signal if it is determined that it is a starting point of the packet signal (first matched filtering process); and detecting maximum energy of correlations in a window zone using the matched filtered data, detecting corresponding time ($T_{1o}$), and determining matched filtered data corresponding to a point at which the matched filtering result has a maximum value, as a multipath delay profile.

The second detection process may include performing matched filtering on the received packet signal if a starting point of the known signal 2 has come (second matched filtering process); and calculating maximum energy of a correlation of an output of the second matched filtering and the multipath delay profile, and setting time corresponding to the maximum energy of the correlation as time ($T_{2o}$) having maximum energy.

Determining matched filtered data corresponding to a point at which the matched filtering result has the maximum value, as a multipath delay profile may include calculating the correlation of the received packet signal and the known signal 1 with respect to time ($T_1$) corresponding to a starting point of the received packet signal, as in the following equation:

$$\chi_{sr}(t_1) = \int_0^T s^*(\tau) r(t_1+\tau) d\tau \text{ for}$$

$T_1 - T_{window-low} \leq t_1 < T_1 + T_{window-high}$, calculating accumulated energy of correlations over Tch time in a window zone as in the following equation:

$$E(t_{11}) = \int_0^{Tch} |\chi_{sr}(t_{11}+\tau)|^2 d\tau \text{ for}$$

$T_1 - T_{window-low} \leq t_{11} < T_1 + T_{window-high} - T_{ch}$, and determining matched filtered data corresponding to a point, at which the accumulated energy of correlations in the window zone has a maximum value, as the multipath delay profile.

The second detection process may include calculating the correlation $\chi_{sr}(t_2)$ of the known signal 2 and the received packet signal as in the following equation:

$$\chi_{sr}(t_2) = \int_0^T s^*(\tau) r(t_2+\tau) d\tau \text{ for}$$

$T_2 - T_{2a} - T_\alpha \leq t_2 < T_2 + T_{2a} + T_\beta$, and where, $T_2 = T_{1O} + T_{TX}$, $(-T_{2a}, T_{2a})$ is a range of changes in arrival time of a first signal and represented by $T_{2a} = T_{TX} \times \Delta_{max}$, $\Delta_{max}$ denotes a maximum amount of a relative Doppler shift, $T_\alpha$ and $T_\beta$ have values of zero or more, which are determined according to the margin of a detection range for estimation of a Doppler shift in the stage of system design, wherein a correlation between the correlation ($\chi_1(t) = \chi_{sr}(T_{1O}+t)$ for $0 \leq t < T_{ch}$) of a window zone and the calculated correlation ($\chi_{sr}(t_2)$) is calculated as in the following equation:

$$\chi_{\chi\chi}(t_2) = \int_0^{Tch} \chi_d^*(\tau) \chi_{sr}(t_2+\tau) d\tau \text{ for}$$

$T_2 - T_{2a} - T_\alpha \leq t_2 < T_2 + T_{2a} + T_\beta$, and wherein the time ($T_{2o}$) of a point, at which the energy of the correlation between multipath delay profile determiner for the known signal 1 and the correlation between the known signal 2 and the received packet signal $\chi_{sr}(t_2)$ has the maximum value, is detected as in the following equation:

$$T_{2O} = \max_{t_2} |\chi_{\chi\chi}(t_2)|^2.$$

The Doppler shift estimation process may include obtaining the Doppler shift as in the following equation:

$$\hat{\Delta} = \frac{T_{2O} - T_{1O}}{T_{TX}},$$

After the first matched filtering process, the method may further include: calculating energy of a matched filtered packet signal in the first matched filtering process; determining whether the calculated energy of the packet signal is equal to or greater than a threshold; and determining that the packet signal begins at a point from which the energy of the packet signal is equal to or greater than the threshold, if energy of the packet signal is equal to or greater than the threshold.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
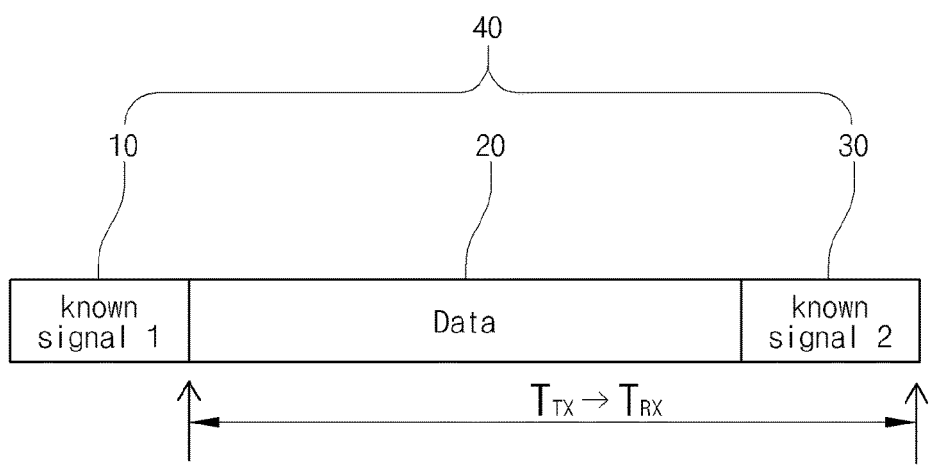
FIG. 1 shows a structure of a packet signal for estimating a Doppler shift for underwater communication.

Embodiments of the present disclosure, to which various modifications and alterations may be made, will be described more fully hereinafter with reference to the accompanying drawings. The embodiments of the present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

When the terms "connected" or "coupled" are used, a component may be directly connected or coupled to another component or may be indirectly connected or coupled to another component via another new component. However, if a component is said to be "directly connected" or "directly coupled" to another component, it should be interpreted as literally as it says. Terms for explaining relationships between components, i.e., "between", "right between", "neighboring to", "directly neighboring to", or the like should be likewise interpreted.

The terminology used herein is for the purpose of describing particular embodiments only and is not intended to limit the disclosure. It is to be understood that the singular forms "a", "an", and "the" include plural references unless the context clearly dictates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Reference will now be made in detail to embodiments, examples of which are illustrated in the accompanying drawings, wherein like reference numerals refer to the like elements throughout. Descriptions of some well-known technologies that possibly obscure the invention will be omitted, if necessary.

Embodiments of the present disclosure will now be described in detail with reference to accompanying drawings.

Figure 2:
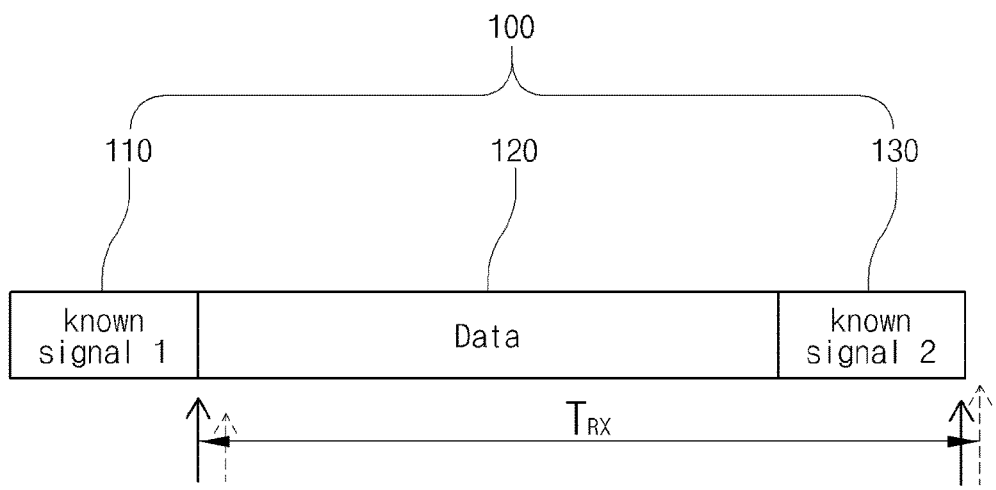
FIG. 2 shows an instance of an error occurring in estimation of a Doppler shift when there are multipaths in similar size.

FIG. 2 shows a structure of a packet signal for estimating a Doppler shift for underwater communication, according to an embodiment of the present disclosure. Referring to FIG. 2, assume that a structure of a packet signal for transmission in the present disclosure is as shown in FIG. 2. The packet signal 100 includes a known signal 1 110, packet data 120 carrying information, and a known signal 2 130. The known signal 1 110 and known signal 2 130 are signals used for estimation of a Doppler shift. It is beneficial to use the same signals for the known signals 1 and 2 110 and 130 because the same matched filter may be used for the same signals in estimating a Doppler shift. Alternatively, different signals may be used for the known signals 1 and 2 110 and 130. In this case that the known signals 1 and 2 110 and 130 are different from each other, although different matched filters are required for the different signals, it is beneficial to prevent confusion of a beginning part and an ending part of the packet signal 100 by comparing outputs of the matched filters of the known signals 1 and 2 110 and 130, which are located in the beginning and ending parts, respectively.

Embodiments of the present disclosure are not limited to the data structure as shown in FIG. 2, but may have different data structures within the scope of the present disclosure. The structure of a packet signal for transmission necessary for estimation of a Doppler shift is intended to transmit two known signals in the packet signal, which do not overlap in time. The two known signals may be located at either ends of the packet signal as shown in FIG. 2, or may be located in the middle of the packet signal with a predetermined time gap. In the following description, assume that the known signals 1 and 2 110 and 130 are the same. A time gap between the known signals 1 and 2 110 and 130 is represented as $T_{TX}$, which is set in advance. Accordingly, it is assumed that a receiver is also aware of the time gap. The data 120 includes information intended to be transmitted.

To focus on the method for estimating a Doppler shift in accordance with embodiments of the present disclosure, it is also assumed that the receiver is aware of the starting point of the packet signal within a margin of error of a few symbols. Such assumptions may be commonly made because the receiver is capable of monitoring and knowing the strength of a received packet signal.

The known signals 1 and 2 110 and 130 are represented as s(t), 0<t<T, where T is the length of the known signal 110, 130, and s(t) may be a baseband signal, a signal of carrier frequency band, or a signal of intermediate frequency band, depending on the applied structure of the receiver. Furthermore, a signal used for the known signal 110, 130 has a superior self-correlation property and has a little change in the self-correlation property even when a Doppler shift occurs. For example, Linear Frequency Modulation (LFM) signals are widely used for the known signals 1 and 2 110 and 130.

Figure 3:
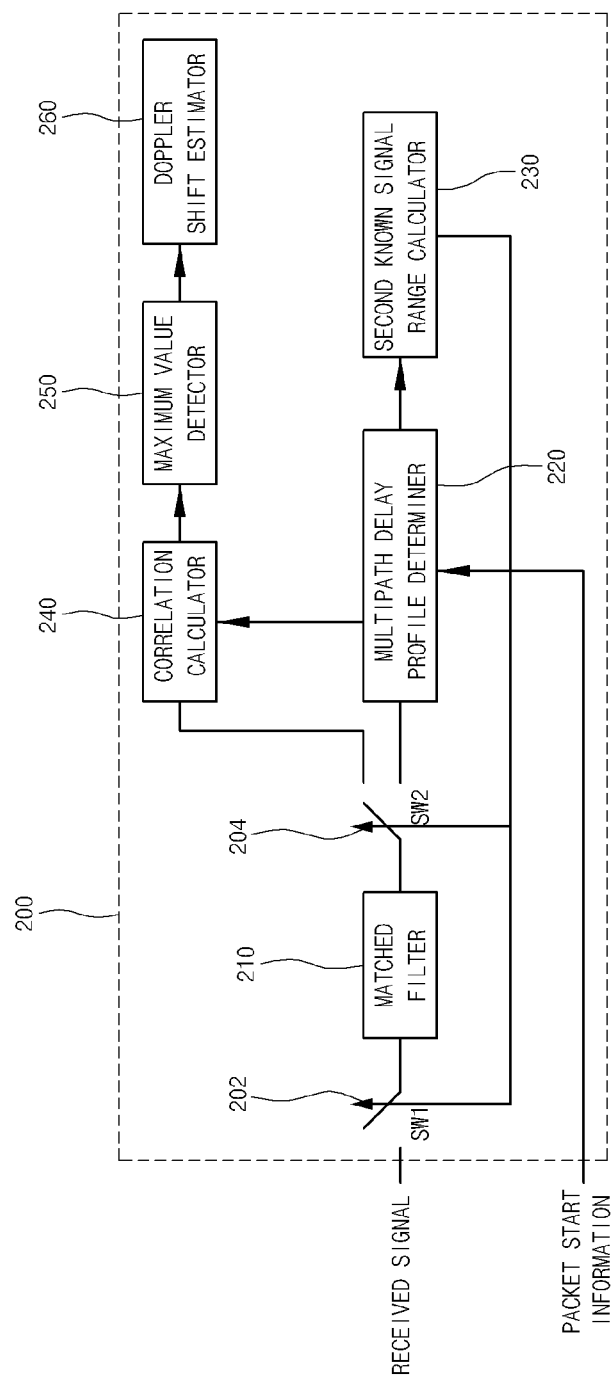
FIG. 3 is a block diagram schematically illustrating a receiver for receiving a packet signal for estimating a Doppler shift, according to an embodiment of the present disclosure.

FIG. 3 is a block diagram schematically illustrating a receiver for receiving a packet signal for estimating a Doppler shift, according to an embodiment of the present disclosure. Referring to FIG. 3, a receiver 200 of the present disclosure may include a matched filter 210, a multipath delay profile determiner 220, a second known-signal range calculator 230, a correlation calculator 240, a maximum energy detector 250, a Doppler shift estimator 260, and first and second switches 202 and 204.

First, the receiver 200 may receive a packet signal. The matched filter 210 in the receiver 200 may receive the packet signal, and perform matched filtering on the received packet signal and output the result. The multipath delay profile determiner 220 may receive information about a starting point $T_1$ of the packet signal.

The first switch 202 may be on to enable the packet signal to be received by the matched filter 210, and the second switch 204 connected to the matched filter 210 is connected to the multipath delay profile determiner 220.

The multipath delay profile determiner 220 may determine a multipath delay profile. The multipath delay profile may be determined by the multipath delay profile determiner 220 in the following second to fourth operations.

Secondly, the multipath delay profile determiner 220 may calculate a correlation between a packet signal r(t) received for time $T_1 - T_{window-low} \le t < T_1 + T_{window-high} + T$ with respect to time $T_1$ corresponding to a starting point of the received packet signal and the known signal 1 110, as expressed in the following equation 5:

$$\chi_{sr}(t_1) = \int_0^T s^*(\tau) r(t_1 + \tau) d\tau, \text{ for } T_1 - T_{window-low} \le t_1 < T_1 + T_{window-high} \quad (5)$$

where s(t) is the known signal 1 110, and s*(t) is a conjugate of s(t). $T_{window-low}$ is the earliest time in a time zone for measuring a multipath channel response, $T_{window-high}$ is the last time in the time zone for measuring the multipath channel response, and a total time duration for measuring the multipath response becomes $T_{window-low} + T_{window-high}$, which is required to be greater than the length $T_{ch}$ of an observing zone for observing the multipath response for estimating a Doppler shift in accordance with an embodiment of the present disclosure. $T_{window-low}$ and $T_{window-high}$ may be selected and used according to a multipath arrival delay profile of an applied channel and a length of an observing zone for calculating energy of the channel response.

Thirdly, the multipath delay profile determiner 220 may calculate energy of correlations in a window zone for the correlations calculated by the matched filter 210 while moving a window function having a size of 1 and a length of $T_{ch}$ across the zone as $T_1-T_{window-low} \leq t_{11} < T_1 + T_{window-high} - T_{ch}$, as expressed in the following equation 6.

$$E(t_{11}) = \int_0^{T_{ch}} |\chi_{sr}(t_{11}+\tau)|^2 d\tau, \text{ for } T_1 - T_{window-low} \leq t_{11} < T_1 + T_{window-high} - T_{ch} \quad (6)$$

While energy is calculated using the calculated correlation in the embodiment of the present disclosure, it may be calculated even with a correlation calculated by the matched filter 210.

Fourthly, the multipath delay profile determiner 220 may detect a point where the energy of a correlation in the window zone as calculated in equation 6 has the maximum value, and detect time corresponding to the point. The time at which the energy of the correlation has the maximum value is $T_{1o}$, where T refers to time, 1 denotes the known signal 1 110, o is short for optional, which may be represented in the following equation 7:

$$T_{1o} = \max_{t_{11}} E(t_{11}) \quad (7)$$

A correlation in the window zone to obtain $T_{1o}$ as in equation 7 may be defined as $x_1(t)$, which is expressed in the following equation 8:

$$\chi_1(t) = \chi_{sr}(T_{1O}+t), \text{ for } 0 \leq t < T_{ch} \quad (8)$$

The multipath delay profile determiner 220 may determine to include energy of the greatest multipath component in the zone with a multipath response observation length $T_{ch}$ in $x_1(t)$.

Fifthly, the second known signal range calculator 230 may calculate a range in which the known signal 2 130 included in the packet signal 100 exists. If there is no Doppler shift, the starting point $T_2$ of the known signal 2 130 of the packet signal is expressed in the following equation 9:

$$T_2 = T_{1O} + T_{TX} \quad (9)$$

A range of changes in arrival time of the first signal of the known signal 2 130 changing by an amount of the maximum relative Doppler shift $\Delta_{max}$ assumed in the communication system is $(-T_{2a}, T_{2a})$, and may be calculated as $T_{2a} = T_{TX} \times \Delta_{max}$. Accordingly, the range in which the known signal 2 130 exists $T_X$ is represented in the following equation 10:

$$T_X = (T_2 - T_{2a}, T_2 + T_{2a}) \quad (10)$$

The second switch 204 connected to the matched filter 210 and the multipath delay profile determiner 220 may disconnect the matched filter 210 from the multipath delay profile determiner 220. The second switch 204 may then connect the matched filter 210 to the correlation calculator 240.

Furthermore, the first switch 202 may disconnect the matched filter 210 from the received signal until a starting point $T_2 - T_{2a} - T_\alpha$ of the range in which the known signal 2 exists, which is calculated as in the equation 10, to prevent operation of the matched filter. The first switch 202 is on at the starting time of the known signal 2 to allow the received signal to be input to the matched filter 210. $T_\alpha$ will be described in connection with equation 11.

Sixthly, the matched filter 210 calculates a correlation between the known signal 2 and the received packet signal as in equation 11. In the equation 11, the correlation is calculated for the zone including and greater than the range in which the known signal 2 130 exists, which is calculated in equations 9 and 10.

While both the known signals 1 and 3 are handled by the matched filter 210 in the embodiment described in connection with FIG. 3, the matched filter 210 is applied only when the known signals 1 and 2 are the same. In other words, if the known signals 1 and 2 are different from each other, two matched filters may be required to handle the known signals 1 and 2, respectively.

$$\chi_{sr}(t_2) = \int_0^{T_s} s^*(\tau) r(t_2+\tau) d\tau, \text{ for } T_2 - T_{2a} - T_\alpha \leq t_2 < T_2 + T_{2a} + T_\beta \quad (11)$$

where, $T_\alpha$ and $T_\beta$ have values of zero or more, which are determined according to the margin of detection range for estimation of a Doppler shift in the stage of system design. In the following description, assume that $T_\alpha$ and $T_\beta$ are set to be zero for convenience of explanation.

Seventhly, the correlation calculator 240 may calculates a correlation between the correlation $x_1(t)$ in the window zone to obtain $T_{1o}$, which is calculated in the equation 8 and the correlation $\chi_{sr}(t_2)$ calculated in the equation 11, as in the following equation 12:

$$\chi_{xx}(t_2) = \int_0^{T_{ch}} \chi_1^*(\tau) \chi_{sr}(t_2+\tau) d\tau, \text{ for } T_2 - T_{2a} - T_\alpha \leq t_2 < T_2 + T_{2a} + T_\beta \quad (12)$$

Eighthly, the maximum value detector 250 may detect a point having the maximum energy of the result calculated in the equation 12, and detect corresponding time of the point. The time of the point having the maximum energy, which is detected by the maximum value detector 250, may be represented as in the following equation 13:

$$T_{2O} = \max_{t_2} |\chi_{xx}(t_2)|^2 \quad (13)$$

Ninthly, the Doppler shift estimator 260 may calculate a relative Doppler shift using time at the point having the maximum energy detected by the multipath delay profile determiner 220 and time at the point having the maximum energy detected by the maximum value detector 250, as in the following equation 14.

$$\hat{\Delta} = \frac{T_{2O} - T_{1O}}{T_{TX}} \quad (14)$$

After completion of estimation of a Doppler shift for one packet, the Doppler shift estimator 260 may be initialized to be able to estimate a Doppler shift for a subsequent packet in the same calculation process.

Figure 4:
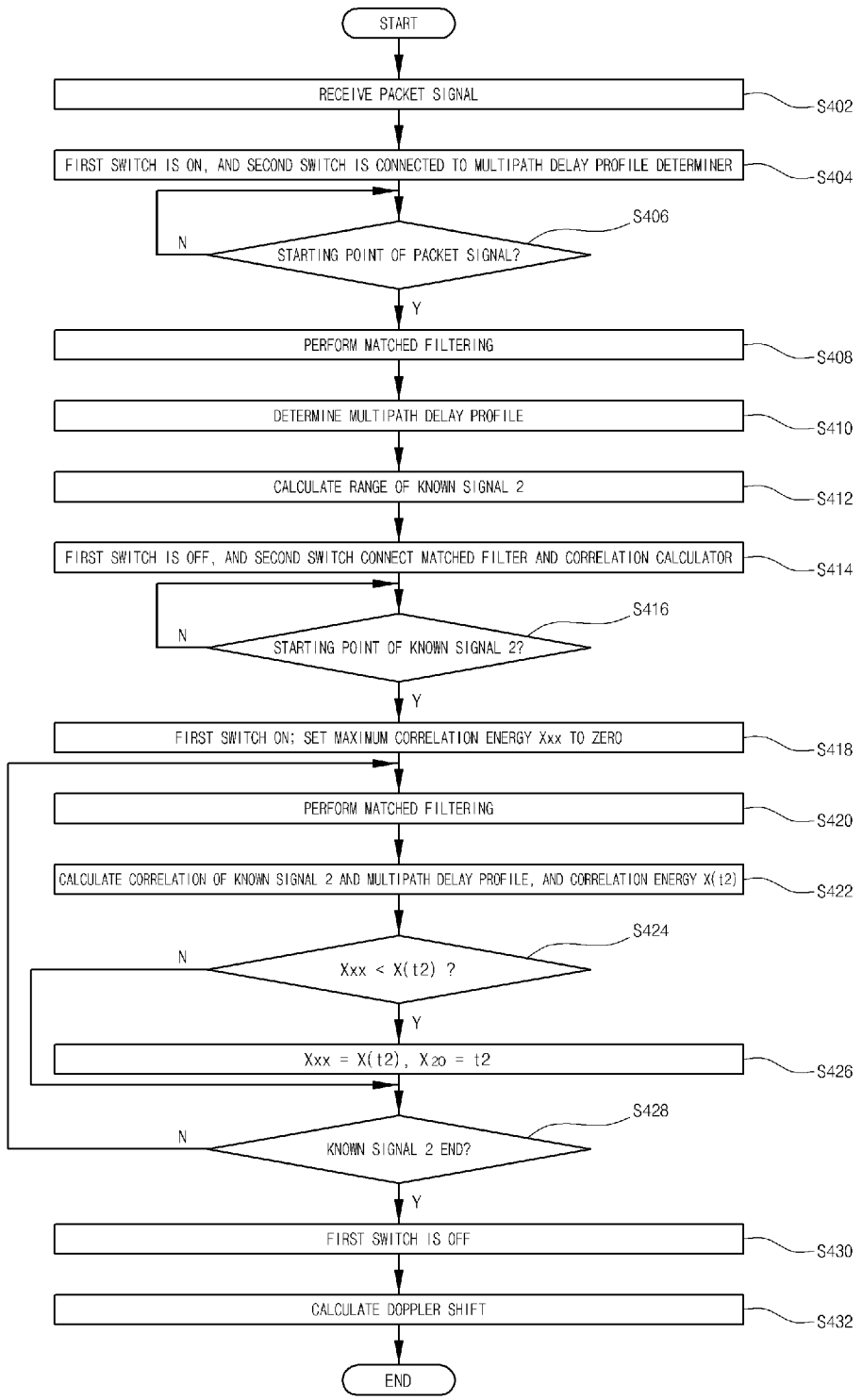
FIG. 4 is a flowchart illustrating a process of estimating a Doppler shift, according to an embodiment of the present disclosure.

FIG. 4 is a flowchart illustrating a process of estimating a Doppler shift, according to an embodiment of the present disclosure. Referring to FIG. 4, the receiver 200 receives the packet signal 100. Specifically, in operation S402, the matched filter 210 in the receiver 200 receives the packet signal 100.

In operation S404, the first switch 202 is on to enable the packet signal 100 to be received by the matched filter 210, and the second switch 204 connected to the matched filter 210 is connected to the multipath delay profile determiner 220.

In operation S406, the multipath delay profile determiner 220 determines whether it is a starting point $T_1 - T_{window-low}$ of observation of the packet signal 100 in the process of receiving the packet signal 100. If it is determined in operation S406 that it is the staring time of the packet observation, i.e., that the known signal 1 110 corresponds to the starting point of observation, the matched filter 210 performs matched filtering on the received packet signal 100, i.e., on the known signal 1 110 in operation S408.

In operation S410, the multipath delay profile determiner 220 determines a multipath delay profile using matched filtered data. The process of determining the multipath delay profile will be described later in more detail in connection with FIG. 6.

In operation S412, the second known signal range calculator 230 may calculate a range in which the known signal 2 130 exists for the received packet signal 100. If there is no Doppler shift, the starting point $T_2$ of the known signal 2 130 in the packet signal 100 is expressed in the equation 9. A range $T_x$ in which the known signal 2 130 varying by a maximum amount of a relative Doppler shift $\Delta_{max}$ assumed in the communication system exists, is represented in the equation 10.

In operation S414, the first switch 202 is off, and the second switch 204 connected to the matched filter 210 and the multipath delay profile determiner 220 disconnects the matched filter 210 from the multipath delay profile determiner 220. The second switch 204 then connects the matched filter 210 to the correlation calculator 240.

In operation S416, the matched filter 210 that was informed of a starting point of the known signal 2 130 determines whether the starting point of the known signal 2 130 has come.

If it is determined that the starting point of the known signal 2 130 has come in operation S416, the first switch 202 is on and a maximum energy value of a correlation is set to be zero in operation S418.

In operation S420, the matched filter 210 performs matched filtering on the received packet signal 100, i.e., on the known signal 2 130.

In operation S422, the correlation calculator 240 calculates a correlation of the known signal 2 130 and the determined multipath delay profile, and correlation energy. The correlation of the known signal 2 130 and the determined multipath delay profile, and the correlation energy are calculated in the equations 11 and 12, respectively.

In operation S424, the correlation calculator 240 determines whether the correlation energy (the square of an absolute value) calculated in operation S422 is greater than stored maximum energy of correlation Xxx.

If it is determined in operation S424 that the correlation energy (the square of an absolute value) calculated in operation S422 is greater than the stored maximum energy of correlation Xxx, the energy of the correlation calculated in operation S422 is set as the maximum energy of the set correlation and the time corresponding to the maximum energy of the correlation is set as a time T2o having the maximum energy, where T refers to time, 2 denotes the known signal 2 130, and o is short for optional, in operation S426.

In operation S428, the matched filter 210 that was informed of an ending point of the known signal 2 130 determines whether the ending point of the known signal 2 130 has come. If it is determined that the ending point of the known signal 2 130 has not come, the process proceeds to operation S420 and repeats operations S420 to S426.

If it is determined in operation S428 that the ending point of the known signal 2 130 has come, the first switch 202 is off in operation S430. Specifically, by performing operations S422 to S428, the time having the maximum energy according to the equation 12 may be calculated according to the equation 13.

In operation S432, the Doppler shift estimator 260 calculates a Doppler shift according to the equation 14. The Doppler shift may be estimated with a gap of arrival time when a correlation calculated between multipath delay profiles in a zone of the known signal 1 110 and a zone of the known signal 2 130 has the maximum energy. This uses a property that the arrival time delay profile of the multipath changes very slowly as compared to a change in size of the multipath components.

Figure 5:
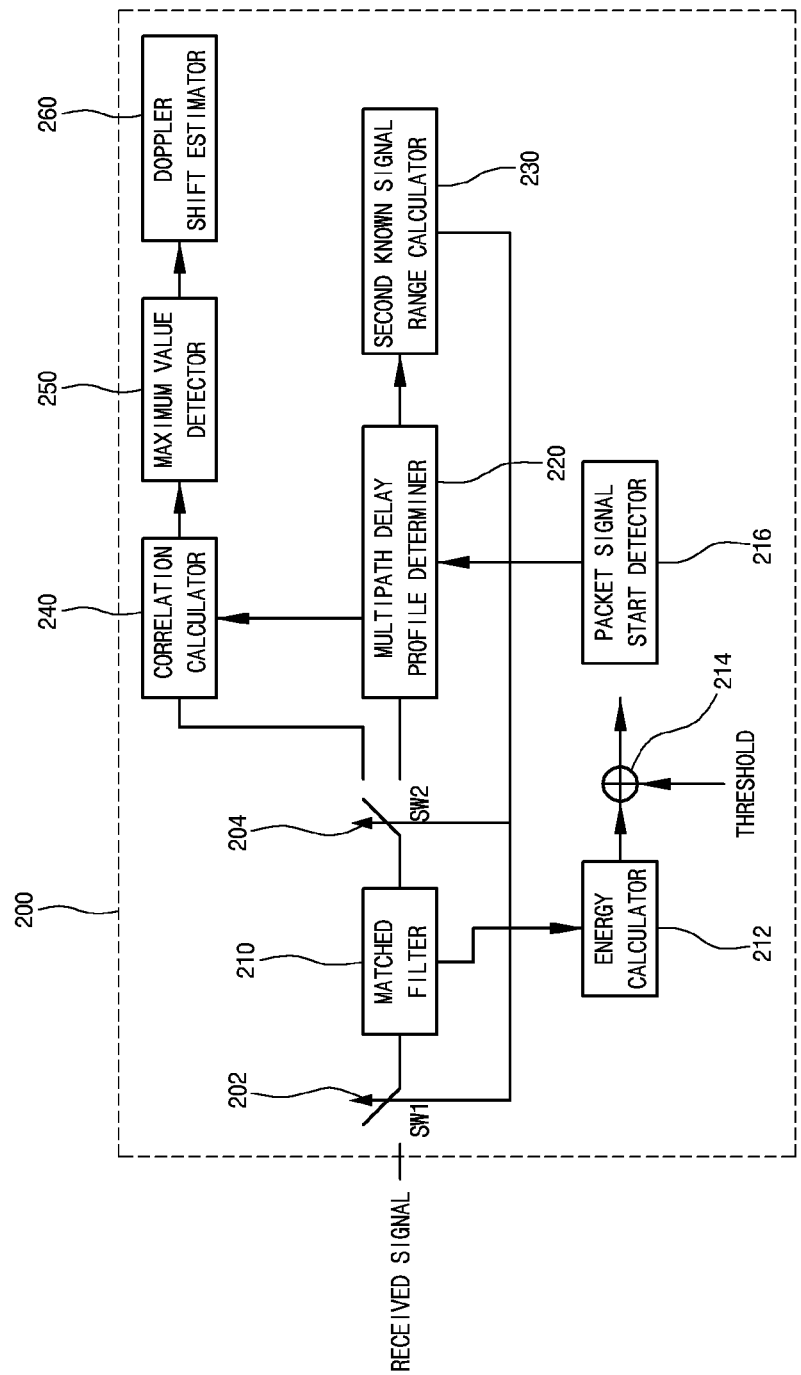
FIG. 5 is a block diagram of a receiver for receiving a packet signal for estimating a Doppler shift, according to another embodiment of the present disclosure.

FIG. 5 is a block diagram of a receiver for receiving a packet signal for estimating a Doppler shift, according to another embodiment of the present disclosure. Referring to FIG. 5, an arrangement for detecting a starting point of the packet signal is shown. The arrangement of a receiver 300 of FIG. 5 is similar to what is shown in FIG. 3, except that it further includes an energy calculator 212, a comparator 214, and a packet signal start detector 216.

Accordingly, only the additional components will be described below in connection with FIG. 5, because the other components are the same as in FIG. 3. First, the energy calculator 212 may calculate energy of a matched filtered packet signal from the matched filter 210.

The comparator 214 may compare the energy of the packet signal calculated by the energy calculator 212 with a threshold.

The packet signal start detector 216 may analyze the comparison result from the comparator 214 and determine that the point is a starting point of the packet signal 100 if the energy is greater than the threshold. The packet signal start detector 216 detects the starting point of the packet signal 100 and sends the starting point to the multipath delay profile determiner 220.

Figure 6:
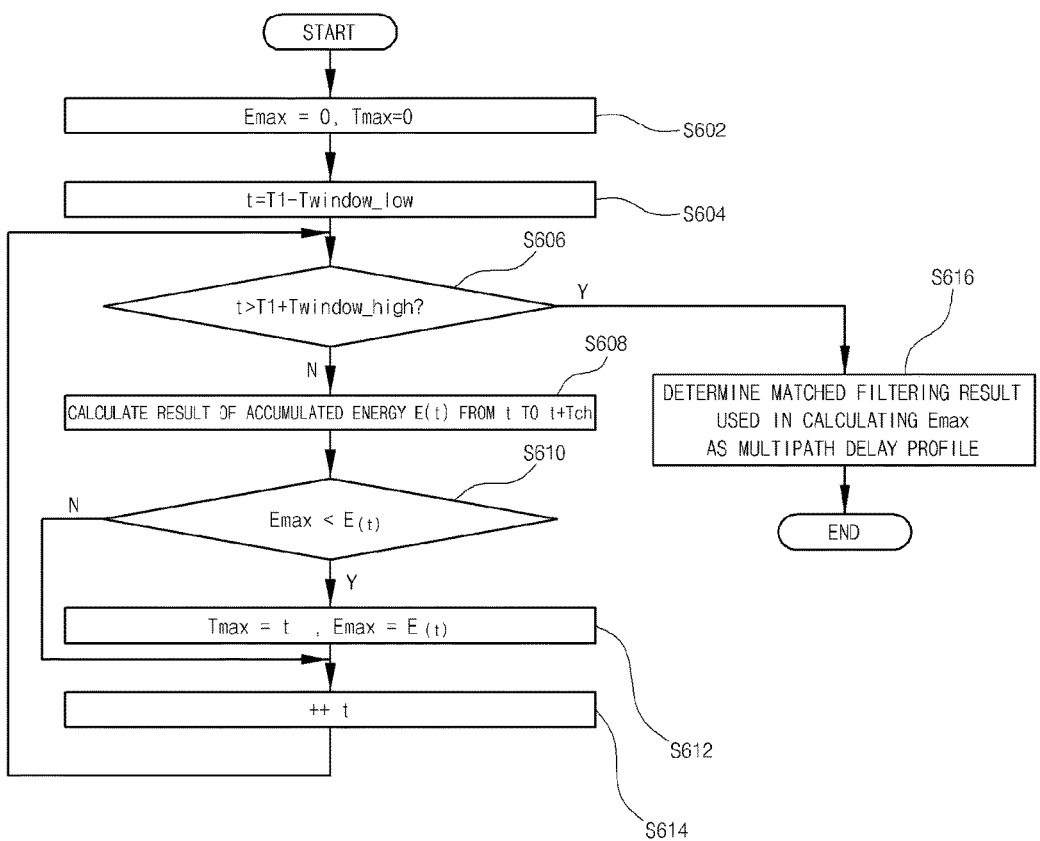
FIG. 6 is a flowchart illustrating operation S410 of FIG. 4 for determining a multipath delay profile, according to an embodiment of the present disclosure.

FIG. 6 is a flowchart illustrating operation S410 of FIG. 4 for determining a multipath delay profile, according to an embodiment of the present disclosure. Referring to FIG. 6, in operation S602, the multipath delay profile determiner 220 sets the maximum energy $E_{max}$ of a correlation of the known signal 1 110 and the received packet signal 100 to be zero, and sets a time $T_{max}$ corresponding to the maximum energy $E_{max}$ to zero.

To calculate a correlation of the received packet signal r(t) for a period $T_1-T_{window-low} \le t < T_1+T_{window-high}+T$ and the known signal 1 110 as in the equation 5, a value of t is set to $T_1-T_{window-low}$ in operation S604. In operation S606, it is determined if the set value of t is greater than $T_1+T_{window-high}$. If it is determined in operation S606 that the set value of t is equal to or smaller than $T_1+T_{window-high}$, the process proceeds to operation S608, and otherwise, if the set value of t is greater than $T_1+T_{window-high}$, the process proceeds to operation S616.

In operation S608, energy E(t), which is a result of accumulating correlations of the matched filter 210 from t to t+$T_{ch}$, is calculated. Specifically, in operation S608, the energy E(t) of correlations of the matched filter 210 from t to t+$T_{ch}$ is calculated by moving a window function having a length of $T_{ch}$ across a zone of $T_1-T_{window-low} \le t_{11} < T_1+T_{window-high}-T_{ch}$. The correlation and correlation energy E(t) in the window zone of the matched filter 210 may be obtained by the equations 5 and 6, respectively.

In operation S610, the multipath delay profile determiner 220 determines whether the calculated energy E(t) of the correlation is greater than $E_{max}$.

If it is determined in operation S610 that the energy E(t) of the correlation is greater than $E_{max}$, $E_{max}$ is set to a value of E(t) calculated in operation S608 and $T_{max}$ is set to time t that corresponds to the E(t), in operation S612. In operation S614, the process returns to operation S606 by incrementing t by a predetermined time. For example, t may be a time gap selected between 0.0001 to 1 second. If it is determined in operation S610 that the calculated energy E(t) of the correlation is equal to or smaller than $E_{max}$, the process returns to operation S614.

In the meantime, while the loop of operations S606 to S614 is iterated, if the multipath delay profile determiner 220 determines that the set value of T is greater than $T_1+T_{window-high}$ in operation S606, the process proceeds to operation S616. In operation S616, the result of matched filtering used in calculating $E_{max}$ is determined as the multipath delay profile. In other words, matched filtered data corresponding to the point where the result of matched filtering has the maximum value is determined as the multipath delay profile.

Figure 7:
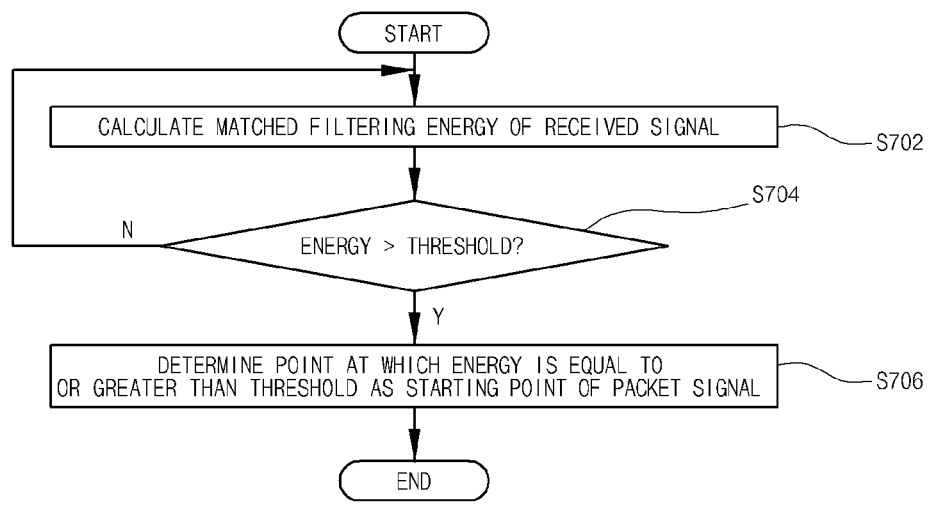
FIG. 7 is a flowchart illustrating an operation of FIG. 5 for detecting a starting point of a packet signal, according to an embodiment of the present disclosure.

FIG. 7 is a flowchart illustrating an operation of FIG. 5 for detecting a starting point of a packet signal, according to an embodiment of the present disclosure. Referring to FIG. 7, in operation S707, the matched filter 210 performs matched filtering on a received packet signal.

In operation S702, the energy calculator 212 may calculate energy of the packet signal that has been matched-filtered by the matched filter 100.

In operation S704, the comparator 214 determines whether energy of the packet signal calculated by the energy calculator 212 is equal to or greater than a threshold.

If it is determined in operation S704 that the energy of the packet signal 100 is smaller than the threshold, the process returns to operation S408.

If it is determined in operation S704 that the energy of the packet signal 100 is equal to or greater than the threshold, the packet signal start detector 216 determines that the packet signal begins from the point at which the energy of the packet signal 100 is equal to or greater than the threshold in operation S706.

In underwater packet communications to deliver information under an underwater channel condition where there are a number of multipath components in similar size, embodiments of the apparatus and method for estimating a Doppler shift for underwater communication provide an advantage of preventing occurrence of significant errors in estimating a Doppler shift and restoring received data, when peak values of outputs of a matched filter corresponding to front and rear parts of a packet signal are determined by respective multipaths because of changes in channel over time and when paths having the peak values of the matched filter in measuring a time gap between the two peak values are wrongly set.

The embodiments of an apparatus and method for estimating a Doppler shift for underwater communication provide another advantage of more accurately and stably estimating a Doppler shift by enabling correct path selection in estimating the Doppler shift in an underwater channel condition where multipath components exist.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for estimating a Doppler shift for underwater communication, the apparatus comprising:
   a multipath delay profile determiner for detecting a correlation between a first known signal and a received packet signal, time $(T_{1o})$ at a point having maximum energy of the correlation, and a multipath delay profile at the time $(T_{1o})$;
   a correlation calculator for calculating a correlation between the multipath delay profile and a correlation between a second known signal and the received packet signal;
   a maximum value detector for detecting time $(T_{2o})$ at a point having maximum energy of the correlation calculated by the correlation calculator; and
   a Doppler shift estimator for determining a Doppler shift using a difference between the time $(T_{1o})$ and the time $(T_{2o})$ at points having respective maximum energy.

2. The apparatus of claim 1, further comprising:
   a matched filter for receiving the packet signal and performing matched filtering on the received packet signal; and
   a second known signal range calculator for calculating a range in which the second known signal exists.

3. The apparatus of claim 1, wherein the multipath delay profile determiner is configured to
   calculate the correlation of the received packet signal and the first known signal with respect to time $(T_1)$ corresponding to a starting point of the received packet signal, as in the following equation:

$\chi_{sr}(t_1)=\int_0^T s^*(\tau)r(t_1+\tau)d\tau$, for $T_1-T_{window-low} \leq t_1 < T_1+T_{window-high}$, calculate accumulated energy of correlations over Tch time in a window zone as in the following equation:

$E(t_{11})=\int_0^{T_{ch}} |\chi_{sr}(t_{11}+\tau)|^2 d\tau$, for $T_1-T_{window-low} \leq t_{11} < T_1+T_{window-high}-T_{ch}$, and
   determine matched filtered data corresponding to a point at which the accumulated energy of correlations in the window zone has the maximum value as the multipath delay profile,
   wherein the time at which the energy of the correlation has the maximum value is $T_{1o}$, which may be represented in the following equation:

$T_{1o}=\max_{t_{11}} E(t_{11})$ where T refers to time, 1 denotes the first known signal, o is short for optional,
   a correlation in the window zone to obtain $T_{1o}$ may be defined as $x_1(t)$, which is expressed in the following equation:

$\chi_1(t)=\chi_{sr}(T_{1O}+t)$, for $0 \leq t < T_{ch}$.

4. The apparatus of claim 2, wherein the second signal range calculator is configured to
   represent the range $(T_X)$ in which the second known signal exists as in the following equation:

$T_X=(T_2-T_{2a}, T_2+T_{2a})$ where, $T_2=T_{1O}+T_{TX}$, $(-T_{2a}, T_{2a})$ is a range of changes in arrival time of a first signal and represented by, $T_{2a}=T_{TX} \times \Delta_{max}$, $\Delta_{max}$ denotes a maximum amount of a relative Doppler shift, and $T_{TX}$ denotes a time gap between the two known signals,
   wherein if there is no Doppler shift, the starting point $T_2$ of the second known signal of the packet signal is expressed in the following equation:

$T_2=T_{1O}+T_{TX}$.

5. The apparatus of claim 2, wherein the matched filter is configured to calculate the correlation $\chi_{sr}(t_2)$ of the second known signal and the received packet signal as in the following equation:

$$\chi_{sr}(t_2) = \int_0^{Ts} *(\tau) r(t_2+\tau) d\tau \text{ for}$$

$T_2 - T_{2a} - T_\alpha \leq t_2 < T_2 + T_{2a} + T_\beta,$ where, $T_2 = T_{1O} + T_{TX}$, $(-T_{2a}, T_{2a})$ is a range of changes in arrival time of a first signal and represented by $T_{2a} = T_{TX} \times \Delta_{max}$, $\Delta_{max}$ denotes a maximum amount of a relative Doppler shift, $T_\alpha$ and $T_\beta$ have values of zero or more, which are determined according to the margin of detection range for estimation of a Doppler shift in the stage of system design, wherein the correlation calculator is configured to calculate a correlation between a correlation $(\chi_1(t) = \chi_{sr}(T_{1O} + t)$ for $0 \leq t < T_{ch})$ in a window zone and the calculated correlation $(\chi_{sr}(t_2))$ as in the following equation:

$$\chi_{\chi\chi}(t_2) = \int_0^{T_\alpha} \chi_1*(\tau) \chi_{sr}(t_2+\tau) d\tau \text{ for}$$

$T_2 - T_{2a} - T_\alpha \leq t_2 < T_2 + T_{2a} + T_\beta,$ and wherein the maximum value detector is configured to detect the time $(T_{2o})$ of a point at which energy of the correlation between multipath delay profile determiner for the first known signal and the correlation between the second known signal and the received packet signal $\chi_{sr}(t_2)$ has the maximum value, as in the following equation:

$$T_{2O} = \max_{t_2} |\chi_{\chi\chi}(t_2)|^2.$$

6. The apparatus of claim 1, wherein the Doppler shift estimator is configured to obtain the Doppler shift in the following equation:

$$\hat{\Delta} = \frac{T_{2O} - T_{1O}}{T_{TX}}$$

where, $T_{TX}$ refers to a time gap between two known signals.

7. The apparatus of claim 2, further comprising:

an energy calculator for receiving a packet signal and calculating energy of the matched filtered packet signal;

a comparator for comparing the energy of the packet signal calculated by the energy calculator with a threshold; and a packet signal start detector for analyzing the comparison result from the comparator to determine that the packet signal begins at the point if the energy is greater than the threshold, and sending information about the point at which the packet signal begins to the multipath delay profile determiner.

8. A method for estimating a Doppler shift for underwater communication, the method comprising:

a first detection process of detecting a correlation between a first known signal and a received packet signal, time $(T_{1o})$ at a point having maximum energy of the correlation, and a multipath delay profile;

a second detection process of detecting time $(T_{2o})$ of a point having maximum energy of a correlation between the multipath delay profile and a correlation between a second known signal and the received packet signal; and a Doppler shift estimation process of determining a Doppler shift using the time $(T_{1o})$ and the time $(T_{2o})$.

9. The method of claim 8, wherein the first detection process comprises:

determining whether the first detection process is subjecting a beginning of the received packet signal to the correlation;

performing a first matched filtering on the received packet signal if it is determined that the first process is subjecting the beginning of the received packet signal to the correlation; and detecting maximum energy of correlations in a window zone using a matched filtering result from the first matched filtering, detecting corresponding time $(T_{1o})$, and determining matched filtered data corresponding to a point at which the matched filtering result has a maximum value, as a multipath delay profile.

10. The method of claim 8, wherein the second detection process comprises:

performing a second matched filtering on the received packet signal when the second known signal is received; and calculating maximum energy of a correlation of the multipath delay profile and an output of the second matched filtering, and setting time corresponding to the maximum energy of the correlation as time $(T_{2o})$ having maximum energy.

11. The method of claim 8, wherein determining matched filtered data corresponding to a point at which the matched filtering result has the maximum value, as a multipath delay profile comprises calculating the correlation of the received packet signal and the first known signal with respect to time $(T_1)$ corresponding to a starting point of the received packet signal, as in the following equation:

$$\chi_{sr}(t_1) = \int_0^{Ts} *(\tau) r(t_1+\tau) d\tau \text{ for}$$

$T_1 - T_{window-low} \leq t_1 < T_1 + T_{window-high},$ calculating accumulated energy of correlations over Tch time in a window zone as in the following equation:

$$E(t_{11}) = \int_0^{Tch} |\chi_{sr}(t_{11}+\tau)|^2 d\tau \text{ for}$$

$T_1 - T_{window-low} \leq t_{11} < T_1 + T_{window-high} - T_{ch},$ and determining matched filtered data corresponding to a point, at which the accumulated energy of correlations in the window zone has a maximum value, as the multipath delay profile, wherein the time at which the energy of the correlation has the maximum value is $T_{1o}$, which may be represented in the following equation:

$$T_{1O} = \max_{t_{11}} E(t_{11})$$

where T refers to time, 1 denotes the first known signal, o is short for optional, a correlation in the window zone to obtain $T_{1o}$ may be defined as $x_1(t)$, which is expressed in the following equation:

$$\chi_1(t) = \chi_{sr}(T_{1O}+t), \text{ for } 0 \leq t < T_{ch}.$$

12. The method of claim 10, wherein the second detection process comprises:

calculating the correlation $\chi_{sr}(t_2)$ of the second known signal and the received packet signal as in the following equation:

$$\chi_{sr}(t_2) = \int_0^{Ts} *(\tau) r(t_2+\tau) d\tau \text{ for}$$

$T_2 - T_{2a} - T_\alpha \leq t_2 < T_2 + T_{2a} + T_\beta,$ and where, $T_2 = T_{1O} + T_{TX}$, $(-T_{2a}, T_{2a})$ is a range of changes in arrival time of a first signal and represented by $T_{2a} = T_{TX} \times \Delta_{max}$, $\Delta_{max}$ denotes a maximum amount of a relative Doppler shift, $T_\alpha$ and $T_\beta$ have values of zero or more, which are determined according to the margin of a detection range for estimation of a Doppler shift in the stage of system design, wherein a correlation between the correlation ($\chi_1(t) = \chi_{sr}(T_{1O}+t)$ for $0 \leq t < T_{ch}$) of a window zone and the calculated correlation ($\chi_{sr}(t_2)$) is calculated as in the following equation:

$\chi_{\chi\chi}(t_2) = \int_0^{T_{ch}} \chi_1^*(\tau) \chi_{sr}(t_2+\tau) d\tau$ for $T_2 - T_{2a} - T_\alpha \leq t_2 < T_2 + T_{2a} + T_\beta$, and wherein the time ($T_{2o}$) of a point, at which the energy of the correlation between multipath delay profile determiner for the first known signal and the correlation between the second known signal and the received packet signal $\chi_{sr}(t_2)$ has a maximum value, is detected as in the following equation:

$T_{2O} = \max_{t_2} |\chi_{\chi\chi}(t_2)|^2$.

13. The method of claim 8, wherein the Doppler shift estimation process comprises obtaining the Doppler shift as in the following equation:

$$\hat{\Delta} = \frac{T_{2O} - T_{1O}}{T_{TX}}$$

14. The method of claim 9 further comprising, after the first matched filtering:

calculating energy of a matched filtered packet signal in the first matched filtering process;

determining whether the calculated energy of the packet signal is equal to or greater than a threshold; and determining that the beginning of the received packet signal is at a point where the energy of the received packet signal is equal to or greater than the threshold, if the energy of the received packet signal is determined to be equal to or greater than the threshold.

* * * * *